United States Patent [19]

Martin

[11] Patent Number: 4,697,377
[45] Date of Patent: Oct. 6, 1987

[54] FINGER GRIP ATTACHMENT FOR A FISHING ROD

[76] Inventor: Russell D. Martin, 8087 Aubun Rd., Winnebago, Ill. 61088

[21] Appl. No.: 918,118

[22] Filed: Oct. 14, 1986

[51] Int. Cl.[4] ............................................. A01K 97/00
[52] U.S. Cl. ......................................... 43/23; 43/25; 273/75; 273/81 D
[58] Field of Search ............ 43/23, 25; 273/75, 81 D, 273/165, 166; 16/124, DIG. 12; 29/78

[56] References Cited

U.S. PATENT DOCUMENTS

| | | | |
|---|---|---|---|
| 472,006 | 3/1892 | Walker et al. | |
| 718,589 | 1/1903 | Tredwell | 43/25 |
| 742,004 | 10/1903 | Carnegie | 273/81 D |
| 1,587,287 | 6/1926 | Denman | 273/165 |
| 2,283,816 | 5/1942 | Loutrel | 43/23 |
| 2,443,946 | 6/1948 | Bozorth | 43/25 |
| 2,476,489 | 7/1948 | Grandinetti | 273/166 |
| 2,522,624 | 9/1950 | Lochen | 43/23 |
| 2,617,676 | 11/1952 | Kinney, Jr. | 294/27 |
| 2,826,852 | 3/1958 | Wardrip | 43/26 |
| 3,237,950 | 3/1966 | Harvey | 273/166 |
| 4,027,419 | 6/1977 | Popell | 43/23 |
| 4,226,418 | 10/1980 | Balfour | 273/75 |
| 4,277,063 | 7/1981 | Perrone | 273/165 |

Primary Examiner—Gene P. Crosby
Attorney, Agent, or Firm—Leydig, Voit & Mayer

[57] ABSTRACT

A strip made of resiliently yieldable material is attached to the handle of a fishing rod and is formed with at least one finger hole enabling the fisherman to maintain a secure hold on the handle. In one embodiment, a portion of the strip is wrapped partially around the handle and is formed with two holes which tightly grip the handle. In another embodiment, the strip is a band which is cinched around the handle and which is formed with a downwardly projecting portion having a finger hole.

10 Claims, 6 Drawing Figures

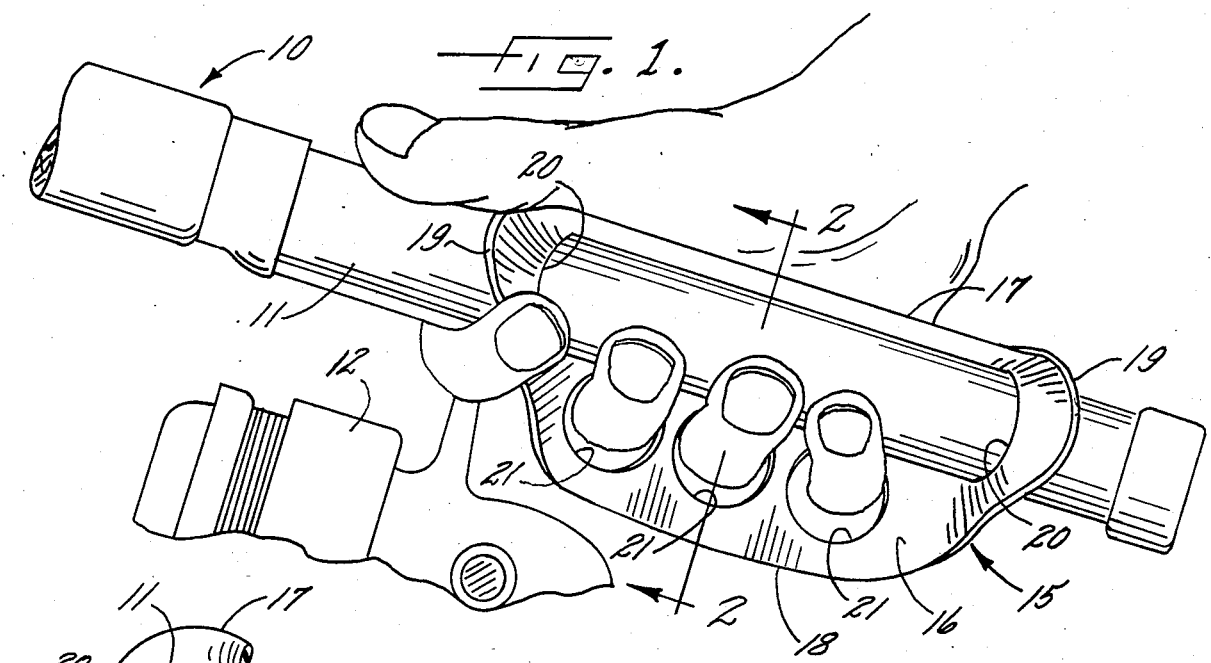
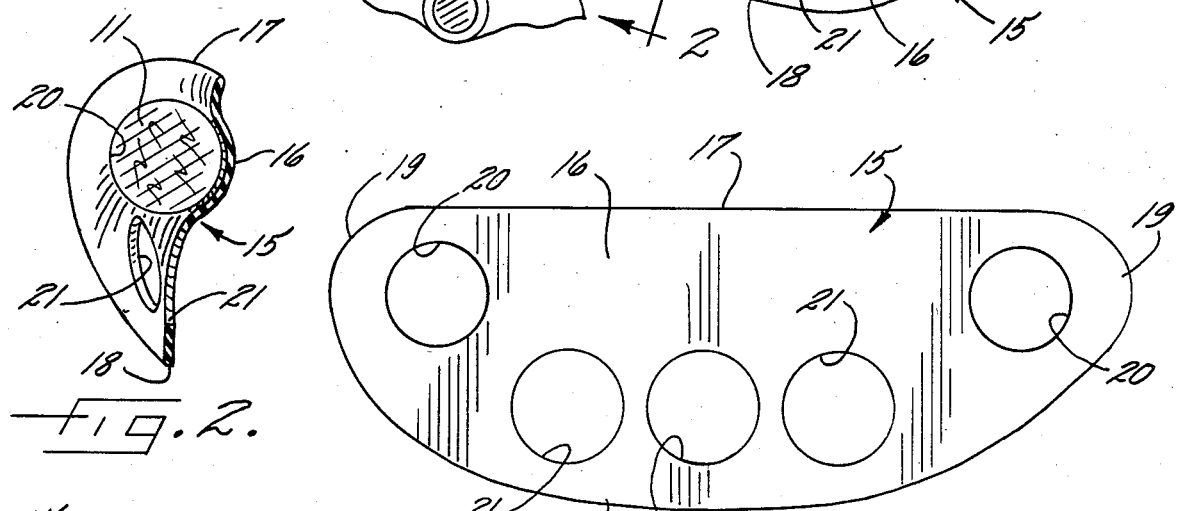
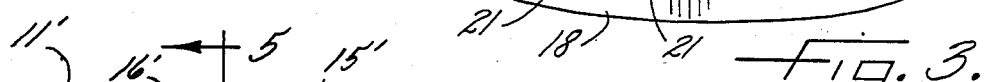
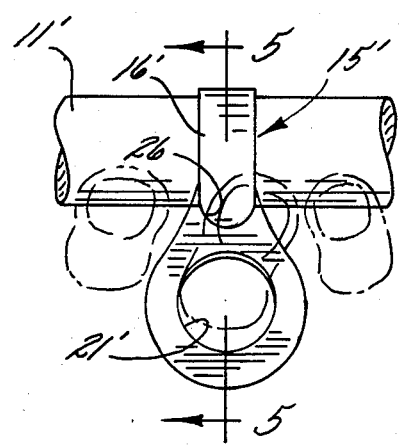
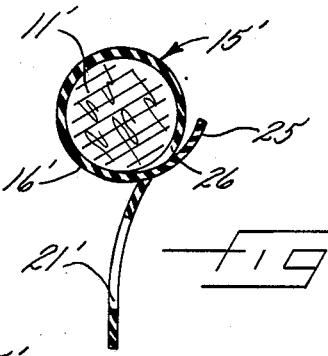
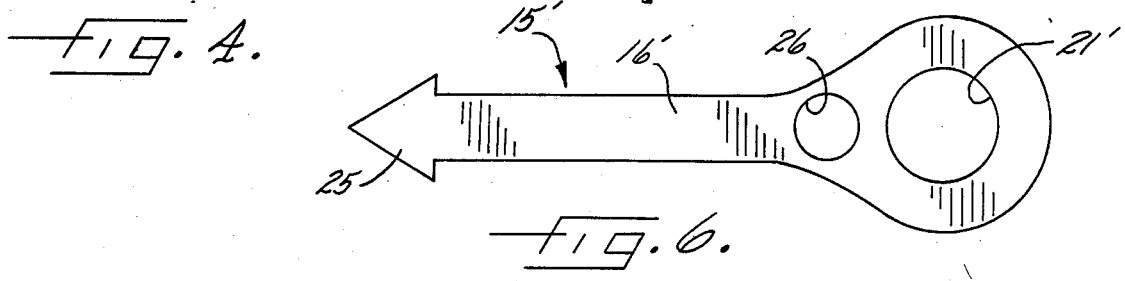

FINGER GRIP ATTACHMENT FOR A FISHING ROD

BACKGROUND OF THE INVENTION

When a fisherman is casting with a fishing rod, there is a tendency for the rod to slip out of the fisherman's hand and fly into the water and especially if the handle of the rod is wet. Also, the rod may be pulled from the fisherman's hand when a large fish strikes or if the hook catches a snag while trailing a rapidly moving boat.

To improve the fisherman's grip and help prevent loss of the rod, Lochen U.S. Pat. No. 2,522,625 discloses a rod having a handle with a finger hole therethrough. The index finger may be inserted through the hole to help the fisherman maintain a firm hold on the handle.

A somewhat similar arrangement is disclosed in Popell U.S. Pat. No. 4,027,419 in which the handle of the rod is formed with a relatively large slot for receiving all four fingers.

While the handles disclosed in the Lochen and Popell patents help improve the hold on the rod, such handles are of a special type requiring special manufacture and are of no use to a fisherman who owns a conventional or ordinary rod. Loutrel U.S. Pat. No. 2,283,816 discloses a detachable finger grip attachment but that attachment is of complex and relatively costly construction.

SUMMARY OF THE INVENTION

The general aim of the present invention is to provide an extremely simple and inexpensive finger grip attachment which may be secured quickly and easily to virtually any fishing rod and which greatly assists the fisherman in maintaining a secure hold on the rod.

A more detailed object of the invention is to achieve the foregoing by providing a finger grip attachment in the form of a simple flexible strip adapted to be attached to the handle of the rod and having finger hole means for accommodating one or more of the fisherman's fingers.

The invention also resides in the novel manner in which flexible strips of the invention may be attached to the handles of fishing rods.

These and other objects and advantages of the invention will become more apparent from the following detailed description when taken in conjunction with the accompanying drawings.

BRIEF DESCRIPTION OF THE DRAWINGS

FIG. 1 is a side elevational view of a typical fishing rod handle equipped with one embodiment of a new and improved finger grip attachment incorporating the unique features of the present invention.

FIG. 2 is a cross-section taken substantially along the line 2—2 of FIG. 1.

FIG. 3 is a side elevational view of the attachment of FIG. 1 prior to installation of the attachment on the rod handle.

FIG. 4 is a fragmentary side elevational view of a fishing rod handle equipped with another embodiment of a finger grip attachment incorporating the features of the invention.

FIG. 5 is a cross-section taken substantially along the line 5—5 of FIG. 4.

FIG. 6 is a side elevational view of the attachment of FIG. 4 prior to installation of the attachment on the handle of the rod.

DETAILED DESCRIPTION OF THE PREFERRED EMBODIMENTS

For purposes of illustration, the present invention is shown in the drawings in conjunction with a conventional fishing rod 10 having a typical generally cylindrical handle 11. While the invention may be used in conjunction with fly rods, cane poles or the like, the rod which has been shown herein is a casting rod equipped with a spinning reel 12.

The present invention contemplates the provision of a new and improved finger grip attachment 15 which is of very inexpensive construction and which may be easily attached to the handle 11 of the rod 10 or the handle of virtually any other rod. Pursuant to the invention, the attachment is formed of a single strip 16 of flexible material and preferably resiliently yieldable material such as rubber.

The preferred attachment 15 is shown in FIGS. 1 to 3 and, as is apparent from FIG. 3, the strip 16 is initially flat and is elongated generally in the direction of elongation of the handle 11. While the shape of the strip may vary, the present strip has a straight upper edge 17, a convex lower edge 18 and a pair of convexly curved end edges 19 which connect the upper and lower edges.

Pursuant to the invention, spaced attachment holes 20 are formed through opposite end portions of the strip 16 near the upper edge 17 and the end edges 19 thereof. The axes of the holes extend perpendicular to the plane of the strip when the latter is in a flat condition. Spaced below and located between the attachment holes 20 are finger hole means which, in the preferred embodiment, comprise three spaced holes 21 whose axes extend parallel to the axes of the attachment holes when the strip is flat. The holes 21 are aligned horizontally with one another and are located near the lower edge 18 of the strip 16.

To install the attachment 15 on the handle 11, the two opposite end portions of the strip 16 are flexed toward one another so as to bring the attachment holes 20 into alinement. The handle thereafter is slipped first through one hole 20 and then the other hole 20. Preferably, the relaxed diameter of each hole 20 is somewhat smaller than the diameter of the handle. As a result, the edges of the holes 20 stretch as the handle is inserted into the holes and then contract around and securely grip the handle to hold the attachment 15 in place.

In the installed position of the attachment 15, part of the strip 16 defines a downwardly projecting portion which extends downwardly from the lower side of the handle 11. The finger holes 21 are located in the downwardly projecting portion and may receive the middle finger, the ring finger and the little finger as shown in FIG. 1. Another portion of the strip wraps partially around the handle and lies against the palm. If desired, that portion may be glued to the handle so as to effect a very tight and more or less permanent connection of the attachment 15 to the handle. It is apparent that the same attachment may be adapted for a left-hand installation.

From the foregoing, it will be apparent that the present invention brings to the art a new and improved finger grip attachment 15 which may be made simple by blanking or cutting a flat piece of inexpensive flexible material. The attachment may be slipped on or removed from the handle 11 in a matter of seconds. Moreover, the attachment may be installed on many types of handles. When installed, the attachment helps the fisherman maintain a secure grip on the rod.

Another embodiment of an attachment 15' embodying the features of the invention is shown in FIGS. 4 to 6 and is even less expensive. The attachment 15' is formed by an elongated resiliently yieldable and initially flat strip 16' whose middle portion ultimately defines a ring-like bank. One end portion of the strip 16' is enlarged, is generally circular and is formed with a single circular finger hole 21'. The opposite end portion of the strip is formed with a retainer 25 which, in this instance, is generally in the shape of an arrow head. The retainer is adapted to coact with a circular retaining hole 26 which is formed through the strip 16' adjacent the finger hole 21'.

To install the attachment 15', the middle or band portion of the strip 16' is wrapped around the handle 11' as shown in FIG. 5. Thereafter, the retainer 25 is threaded through and locked within the retaining hole 26 to cinch the strip in place. Glue may be used to effect a more permanent attachment.

In the installed position of the strip 16', the end portion with the finger hole 21' projects downwardly from the lower side of the handle 11'. One finger may be inserted through the hole 21' to prevent the handle from flying out of the fisherman's hand.

I claim:

1. A finger grip attachment for the handle of a fishing rod, said attachment comprising a single strip of flexible material formed separately of said handle, means for securing said strip to said handle with a portion of said strip curving around at least part of said handle and with another portion of said strip projecting downwardly from the lower side of said handle, at least one finger hole extending through said downwardly projecting portion of said strip, said strip being formed with two additional holes spaced above said finger hole and located on opposite sides of said finger hole, said additional holes receiving said handle and constituting said means for securing said strip to said handle.

2. A finger grip attachment as defined in claim 1 in which said strip is made of resiliently yieldable material, said additional holes each having a relaxed diameter smaller than the diameter of said handle whereby the edges of said additional holes stretch to permit such holes to receive said handle and then contract around and grip said handle.

3. A finger grip attachment as defined in claim 1 further including additional finger holes formed through said strip and located on opposite sides of said one finger hole.

4. A finger grip attachment for the handle of a fishing rod, said grip comprising a flat strip of resiliently yieldable material, a pair of holes formed through opposite end portions of said strip and located so as to receive said handle when said end portions are flexed toward one another and when a portion of said strip is wrapped partially around said handle, and a finger hole formed through said strip below and between said pair of holes.

5. A finger grip attachment as defined in claim 4 in which each hole of said pair has a relaxed diameter smaller than the diameter of said handle whereby the edges of such holes stretch to permit such holes to receive said handle and then contract around and grip said handle.

6. A finger grip attachment as defined in claim 5 further including additional finger holes located on opposite sides of said one finger hole and located below and between said pair of holes.

7. A finger grip attachment for the handle of a fishing rod, said grip comprising an elongated strip of flexible material, one end portion of said strip being wrapped around and secured to said handle while leaving the opposite end portion of said strip extending downwardly from the lower side of said handle, a finger hole formed through said opposite end portion of said strip, a retaining hole formed through said strip adjacent said finger hole, and a retainer on one end of said strip and extending through said retaining hole to secure said strip to said handle.

8. A finger grip attachment as defined in claim 7 in which said retainer is generally in the shape of an arrow head.

9. A finger grip attachment for the handle of a fishing rod, said attachment comprising a single strip of flexible material formed separately of said handle, means for securing said strip to said handle with a portion of said strip curving around at least part of said handle and with another portion of said strip projecting downwardly from the lower wide of said handle, and at least one finger hole extending through said downwardly projecting portion of said strip, said strip comprising a band having a portion wrapped around said handle, said downwardly projecting portion being defined by one end portion of said band, the opposite end portion of said band being formed with a retainer, and a retaining hole extending through said band adjacent said downwardly projecting portion for receiving said retainer, said retainer and said retaining hole constituting said means for securing said band to said handle.

10. A finger grip attachment as defined in claim 9 in which said retainer is shaped generally as an arrow head.

* * * * *